Dec. 13, 1955  J. THOMAS  2,726,886
PACKING FEED FOR STUFFING BOX
Filed Dec. 18, 1953  2 Sheets-Sheet 1
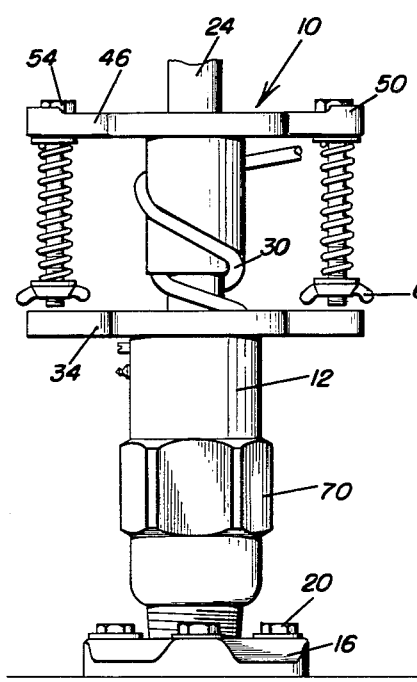
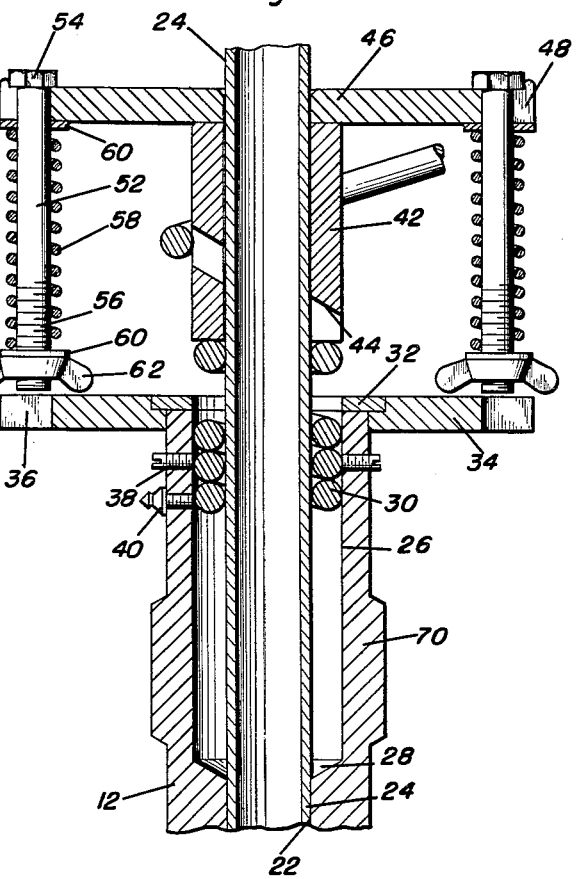
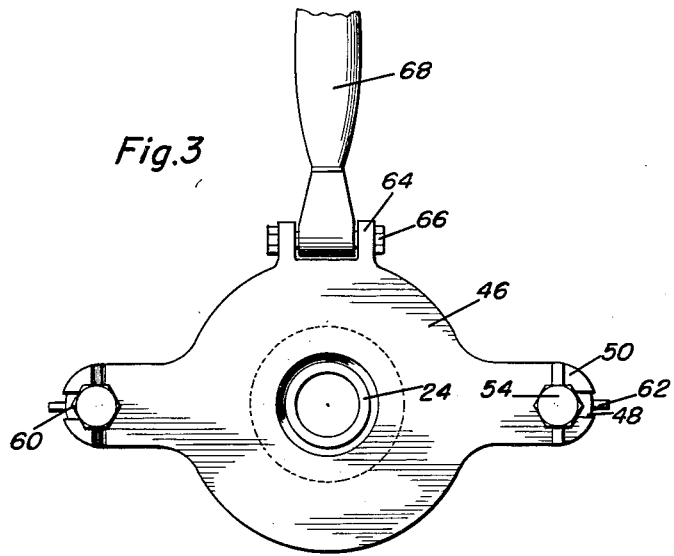
John Thomas
INVENTOR.

Dec. 13, 1955  J. THOMAS  2,726,886
PACKING FEED FOR STUFFING BOX
Filed Dec. 18, 1953  2 Sheets-Sheet 2

John Thomas
INVENTOR.

United States Patent Office 2,726,886
Patented Dec. 13, 1955

2,726,886

PACKING FEED FOR STUFFING BOX

John Thomas, El Dorado, Kans., assignor of fifty per cent to Deep Rock Oil Corporation, Tulsa, Okla., a corporation of Delaware Application December 18, 1953, Serial No. 399,017

2 Claims. (Cl. 286—33)

This invention relates to a packing feed for a stuffing box which is employed for packing and repacking a stuffing box with a minimum of expended time.

An object of this invention is to provide a packing feed for stuffing boxes wherein the stuffing box may be packed without dismantling and with a saving in time and consequent reduced cost.

Another object of this invention is to provide a packing feed for a stuffing box employing a continuous piece of packing material wherein reserve packing material is provided which may be introduced into the stuffing box when necessary.

A still further object of this invention is to provide a packing feed for stuffing boxes which may be utilized with all types of packing and for all types of sealing purposes which incorporates a simplicity of construction and readily obtainable materials wherein the device lends itself to an inexpensive manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the packing feed of this invention showing the packing being fed into the stuffing box;

Figure 2 is an enlarged longitudinal, vertical section taken substantially along a plane through the center line of the device of Figure 1 showing the structural details of the stuffing box, packing and packing gland;

Figure 3 is an enlarged top plan view of the structure of Figure 1;

Figure 5:
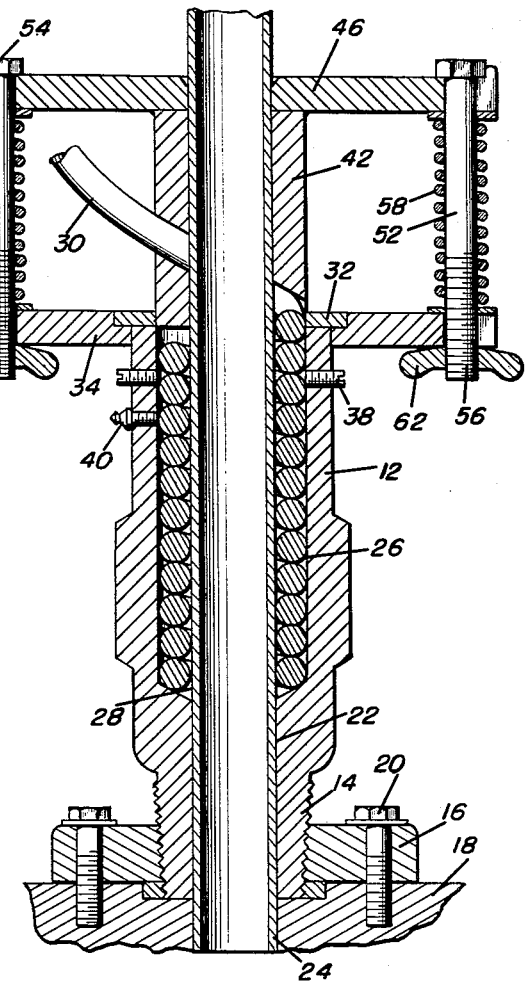
Figure 5 is an enlarged longitudinal, vertical section taken substantially along the center line of the construction of Figure 4.
Figure 4:
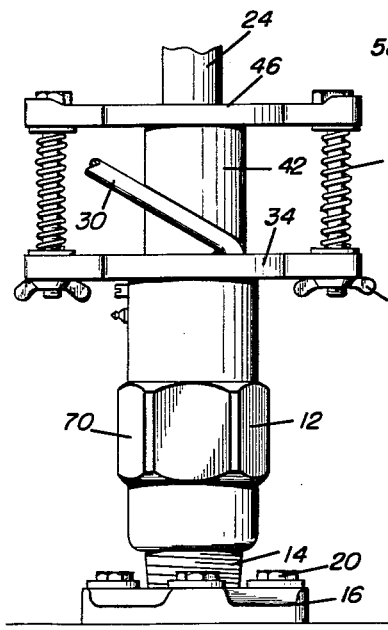
Figure 4 is a side elevational view of the device of this invention similar to Figure 1 showing the packing gland in position and held in packing relation to the packing in the stuffing box.

Referring now specifically to the drawings, it will be seen that the numeral 10 generally indicates the packing feed of this invention for packing or repacking a stuffing box generally indicated by the numeral 12.

The stuffing box 12 is generally tubular in nature having an externally threaded lower end portion 14 for receiving a flange 16 thereon wherein the flange is attached to a housing 18 by suitable bolts 20 or other fastening means. The stuffing box 12 is provided with a tubular portion 22 closely receiving a slidable or rotatable rod or tube 24 such as the piston rod usually employed in a reciprocating type pump as used in subsurface oil well pumps. The tubular stuffing box 12 is also provided with an enlarged tubular portion 26 having an inwardly and downwardly tapered bottom portion 28 which is in communication with the smaller tubular portion 22. The tubular portion 26 is adapted to receive a continuous piece of packing material 30 wound into a coil about the piston rod 24 and disposed about the piston rod 24 and between the rod 24 and the tubular portion 26 of the stuffing box 12 wherein the packing material 30 seals the stuffing box 12 against leakage around the piston rod 24. The upper end of the stuffing box 12 is provided with an outwardly projecting peripheral flange 32 and a flange member 34 has a portion engaging beneath the flange 32 and rotatable about the tubular stuffing box 12. The outer ends of the flange member 34 are slotted at 36 for a purpose described hereinafter and suitable setscrews 38 are threaded into the stuffing box 12 wherein the flange 34 is maintained adjacent the flange 32. The packing material 30 may be of any well known type of material and if necessary a grease fitting 40 may be threaded into the stuffing box 12 and in communication with the tubular portion 26 wherein lubrication may be passed into the interior of the stuffing box 12 thereby lubricating the piston rod 24.

The packing feed of this invention includes a tubular member 42 closely surrounding the rod 24 and the tubular portion 42 is provided with a spiral groove or slot 44 extending from the lower end of the tubular portion 42 upwardly and spirally around the tubular portion 42. The upper end of the tubular portion 42 is provided with a transversely extending flange 46 having a slotted portion 48 at each remote end thereof and the extreme edge of the flange 46 is provided with an upstanding portion 50 on each side of the slot 48. The slotted portions 48 removably receive bolt members 52 having an enlarged head 54 at one end thereof and a threaded portion 56 at the other end thereof. The enlarged head portion 54 is positioned behind the upstanding portions 50 wherein the bolt 52 is held in assembled relation with the flange 46. A compression coil spring 58 is positioned around the bolt 52 and washers 60 are disposed at each end of the spring 58. A wing nut 62 threadedly engages the threaded portion 56 of the bolt 52 and the threaded portion 56 of the bolt 52 is adapted to removably engage the slotted portion 36 of the flange 34 wherein the flanges 46 and 34 may be adjusted in vertical relation to each other wherein the tubular portion 42 may be drawn towards the tubular portion 26 of the stuffing box 12. It is seen that the packing material 30 is coiled about the rod 24 and is positioned in the spiral slot 44 wherein the tubular portion 42 may be rotated in a clockwise direction and thereby coiling the packing material 30 about the rod 24.

Figure 6:
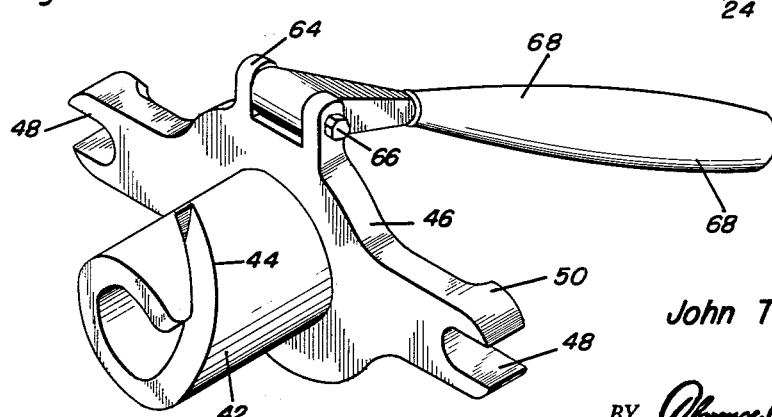
Figure 6 is a detail perspective view of the packing gland.

As shown in Figures 3 and 6, the flange 46 is provided with a pair of projecting lugs 64 having a pin 66 extending therebetween. A handle member 68 is pivotally mounted on the pin 66 wherein the handle 68 extends transversely of the flange 46 or parallel thereto as desired. In its parallel relation, the handle 68 may be utilized for easy rotation of the tubular member 42 and the slot 44 therein. Further, it will be seen that the stuffing box 12 is provided with a polygonal portion 70 for easy attachment of the stuffing box 12 to the flange 16 or the housing 18 as the particular installation may determine.

The operation of the device will be readily understood. The tubular portion 42 is assembled over the rod 24 and the packing material 30 is fed through the slot 44 as the handle 68 is utilized to rotate the flange 46 and the tubular portion 42 thereby coiling the packing material 30 about the rod 24. As the handle 68 is rotated about the axis of the rod 24, the packing material 30 may be pushed into the tubular portion 26 of the stuffing box 12 wherein the packing material 30 is correctly positioned in the stuffing box. When the stuffing box has been completely filled with packing material 30, the bolts 52 may be positioned between the flanges 34 and 46 in an obvious manner and the flanges moved towards each other wherein the tubular portion 42 is moved into the upper end of the tubular portion 26 of the stuffing box 12. This action compresses the packing material 30 thereby sealing the stuffing box and the piston rod 24. Obviously, any excess packing material 30 may be left hanging loose and when more packing material is needed in the stuffing box 12, the handle 68 may be rotated thereby rotating both of the flanges 46 and 34 and urging more material into the stuffing box 12. When it is desired to repack the stuffing box 12, the bolts 52 may be disconnected and the handle 68 utilized to rotate the tubular member 42 in a counter-clockwise direction thereby pulling or uncoiling the flexible packing material 30 in an obvious manner. Any and all types of packing material may be utilized and the particular cross-sectional shape is optional and the device of this invention may be used in sealing all types of fluids and the particular size or type of pumping housing or T18 and the particular size of the piston 24 may be varied as desired.

It will be understood that the packing gland 10 is swivelly mounted on the stuffing box 12 and springs 58 tend to center and align the tubular member 42 with the stuffing box 12 thereby providing a self-aligning packing gland. It will be understood that the device of this invention permits easy repacking in less time than usual thereby saving the cost of labor and the cost of the down time while repacking the pump. Obviously, the packing feed of this invention may be utilized wherever it is desired to seal a pipe or rod extending from a fluid pressurized area to another area having less fluid pressure. In the specific embodiment illustrated, the rod 24 is in the nature of a piston rod used in a reciprocating pump and the device is also especially useful in the centrifugal or rotary type pumps wherein the rod 24 is in the nature of a rotating shaft or the like. All parts of the packing feed of this invention may be constructed of cast iron or other low cost materials.

From the foregoing, the construction and operation of the device will be readily understood and further explanation is believed to be unnecessary. However, since numerous modifications and changes will readily occur to those skilled in the art, it is not desired to limit the invention to the exact construction shown and described and accordingly all suitable modifications and equivalents may be resorted to, falling within the scope of the appended claims.

What is claimed as new is as follows:

1. A packing assembly for a movable rod comprising a tubular stuffing box, a transverse flange at one end of said stuffing box, said stuffing box surrounding the rod in spaced relation, a packing gland having an elongated tubular portion surrounding the rod and telescopically receivable in said stuffing box, a flange on the upper end of the gland, a spiral slot in the lower end of the tubular portion of said gland, said slot terminating in spaced relation to the packing gland flange, said slot forming a passage through the lower end of the gland into the stuffing box, a handle on said gland for rotation thereof for coiling and uncoiling a packing member through the passage in the gland, and adjustable fastening means removably extending between the flanges for urging the tubular portion of the gland into the stuffing box thereby compressing the coiled packing member positioned in the stuffing box.

2. A packing assembly as set forth in claim 1 wherein the adjustable fastening means comprises oppositely disposed bolt members removably secured between the flanges, and compression springs circumposed on said bolt members in engagement between opposed portions of said flanges.

References Cited in the file of this patent

UNITED STATES PATENTS

| | | |
|---|---|---|
| 679,922 | Titus et al. | Aug. 6, 1901 |
| 992,109 | Campbell | May 9, 1911 |
| 1,631,343 | Segelhorst | June 7, 1927 |
| 1,879,478 | Pruiett | Sept. 27, 1932 |
| 2,608,424 | Everett | Aug. 26, 1952 |